Oct. 28, 1958 W. W. GARVIN ET AL 2,858,069
SEISMIC CROSS-SECTION PLOTTING CALCULATOR
Filed July 23, 1953 3 Sheets-Sheet 1

INVENTORS
WALTER W. GARVIN
GLENN A. SCHURMAN
BY
ATTORNEYS

United States Patent Office 2,858,069
Patented Oct. 28, 1958

2,858,069

SEISMIC CROSS-SECTION PLOTTING CALCULATOR

Walter W. Garvin, Fullerton, and Glenn A. Schurman, Whittier, Calif., assignors to California Research Corporation, San Francisco, Calif., a corporation of Delaware Application July 23, 1953, Serial No. 369,920

2 Claims. (Cl. 235—61)

Our invention relates to a method and apparatus for the computation of seismic data and particularly to the preparation therefrom of a seismic cross-section.

Seismic exploration is an activity in which time is often of great importance. It is necessary then that conversion of seismic data into usable information be made as rapidly as possible. Under normal circumstances the competitive search for oil is such that a company must rapidly evaluate the likelihood of producing petroleum in a region if the company is to lease the area at a reasonable royalty, if at all. Under other circumstances it is a common practice to compute seismic data as a seismic survey is in progress in order to decide the thoroughness with which a given region is to be explored. Accordingly, a number of short cuts have been developed which facilitate the rapid preparation of a cross-section from seismic field data. One such calculating procedure involves the use of a wave-front chart. An example of such a wave-front chart is shown in Exploration Geophysics, J. J. Jakosky, 1950, Trija Publishing Company, Los Angeles, California, page 686. Before such a chart can be constructed, a velocity-depth relation as determined by well surveys or other conventional means must be established. From these data, the functional form and numerical values of the parameters of the equation describing the velocity function are determined. This equation is used to construct the wave-front chart.

The preparation of such charts is laborious and time-consuming. Accordingly, it is the practice among seismic exploration organizations to use a specific velocity function and, consequently, a single wave-front chart in a given region. This procedure introduces an error in the seismic cross-section due to the existence of lateral velocity variations. It is also inherently inefficient in that it does not make the best use of available velocity control.

In the normal process of reducing seismic field data to usable form, the dip and depth of reflecting strata are plotted on a seismic cross-section. The wave-front chart with which the reduction of the data is made may be based on velocity information obtained from a well. The seismic cross-section in the vicinity of that well is, then, expected to be accurate. If the same wave-front chart which was applicable in the vicinity of this well is used in preparing a seismic cross-section which extends to another well, the varying characteristics of the earth between the two wells may cause miss-ties at the second well. A log may be made of the second well to determine the depths of strata which were encountered in the first well. A proper seismic cross-section would indicate correctly the positions of these strata in the first well and trace their surfaces to the second well. Frequently it is found that the seismic cross-section based on velocity data at one well indicates an erroneous position of subterranean strata at a second well. Where the computed seismic cross-section at the second well differs from the actual cross-section at this point ascertained by logging the well, the seismic cross-section is corrected. We have found that conventional linear adjustment of the computed reflection horizons may be distributing a miss-tie evenly between velocity control points, such as wells within a region being explored, is capable of introducing appreciable error into the seismic cross-section. This error may be sufficient to indicate the existence of a sizable spurious anticline or, under other circumstances, it may prevent the discovery of an important anticline. If means were available for changing conveniently the velocity function along the line of profiling, these errors would tend to be minimized.

Accordingly, it is an object of our invention to provide a novel method and apparatus for rapidly computing seismic data.

It is a further object of our invention to provide a method of preparing a seismic cross-section which will facilitate the use of all known velocity control throughout the area under investigation.

It is a further object of our invention to provide a universal wave chart and apparatus for plotting from that chart directly onto a seismic cross-section.

Briefly stated, our invention lies in the use of a wave chart for a velocity function having a predetermined functional form. A scaling device is adjusted in accordance with the velocity parameters in the geological region which is being plotted. The scaling device is then used in connection with the dimensionless wave chart to plot directly a seismic cross-section. The effect of our invention is to permit the use of a single wave-front chart to make calculations heretofore obtainable only through the use of a number of wave-front charts.

The novel features of our invention are set forth with more particularity in the accompanying claims. The invention itself, however, with respect to the details thereof, together with its additional objects and advantages, may be better understood from the following description of a specific embodiment with reference to the accompanying drawings, in which:

Figure 1:
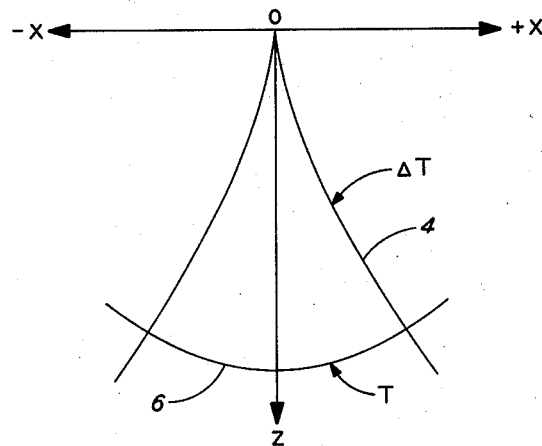
Fig. 1 is a schematic representation of a conventional wave-front chart.

Fig. 1 illustrates the essential characteristics of conventional wave-front charts of the type shown on page 686 of Exploration Geophysics. Such a chart has two families of curves related to rectangular coordinates which represent depth $z$ and migration distance $x$. One family of curves constitutes lines of constant step-out $\Delta T$, which are rays 4 leaving the origin O. The other family of curves represents wave-fronts 6, which are lines of constant arrival time T. To simplify the illustration, only two rays 4 and one wave-front 6 are shown. It will be understood that a usable chart would have a number of rays and wave-front lines, as shown in the publication Exploration Geophysics referred to above. The velocity function to which the wave-front chart applies is implicitly contained in such a graph, both as to its functional form and as to the numerical values of the parameters. In accordance with previous conventional practice, a new chart must be drawn whenever either the functional form or the value of the parameters is changed. Consider the velocity function $$V = V_0 + kt_v$$

where $V$ = average velocity $V_0$ = initial velocity of a seismic disturbance at the shot point $t_v$ = one-way vertical time $k$ = a constant determined by measurements of a seismic velocity The conventional wave-front chart for such a velocity function would have a shape determined by the measured value for the constants $V_0$ and $k$. Such a chart would be applicable only to a particular region for which the values of $V_0$ and $k$ have been determined. For other regions where different values apply, it has been necessary to construct a new chart.

The equation $V = V_0 + k t_v$ may be converted into the form $$z = V_0 t_v + k t_v^2$$

where $z =$ depth below the datum plane

Figure 2:
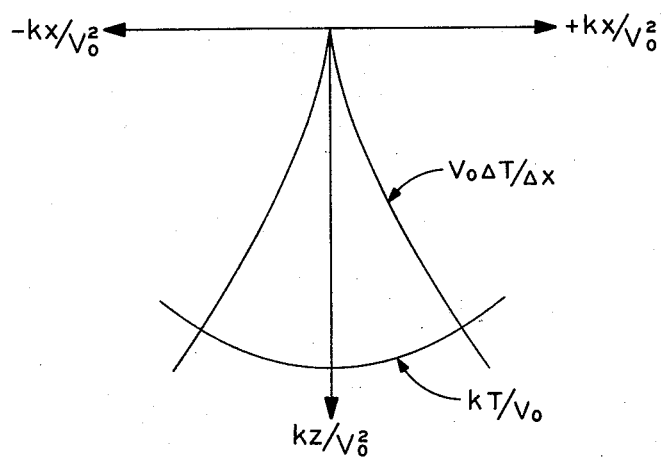
Fig. 2 is a schematic representation of a dimensionless wave-front chart.

We have found that a universal wave-front chart which can be applied to various regions can be drawn by using dimensionless variables, thereby eliminating the necessity for drawing a new chart for each region. Fig. 2 illustrates a dimensionless wave-front chart for the above function, in which the coordinates are $kz/V_0^2$ and $kx/V_0^2$, and the grid consists of lines along which $kT/V_0$ and $V_0 \Delta T / \Delta x$ are constant. All of these quantities are dimensionless numbers. The dimensionless chart is constructed according to the following relationships:

$$\frac{kz}{V_0^2} = \frac{1}{4}\left[\frac{\sin^2(\theta_0 + \tau \sin \theta_0)}{\sin^2 \theta_0} - 1\right] \quad (1)$$

$$\frac{kx}{V_0^2} = \frac{1}{4 \sin \theta_0}\left\{\tau - \cos \theta_0 \left(\frac{\sin(2\theta_0 + 2\tau \sin \theta_0)}{\sin 2\theta_0} - 1\right)\right\} \quad (2)$$

$$\tan \theta = \tan \theta_0 \sqrt{\frac{1 + \eta}{1 - \eta \tan^2 \theta_0}} \quad (3)$$

where $$\tau = \frac{kT}{V_0}$$

$\theta_0 =$ the angle at which the ray being calculated leaves the shot point $= \sin^{-1} \dfrac{V_0 \Delta T}{\Delta x}$ $\theta =$ the angle between the $\dfrac{kz}{V_0^2}$ direction and a particular $\dfrac{V_0 \Delta T}{\Delta x}$ line on the graph $$\eta = 4 \frac{kz}{V_0^2}$$

These equations determine the shape of the wave-front chart. The scale in the $x$ and $z$ directions determines its size. This chart is called "universal" because it is applicable to any combination of values of the parameters $V_0$ and $k$ and need not be re-drawn whenever these values are changed. Such a chart is shown in Fig. 3.

According to the conventional practice, wave-front charts are drawn to the same scale as the proposed seismic cross-section, which is usually 20 feet to the millimeter. This permits the profile to be calculated by placing transparent graph paper over the wave-front chart and plotting reflections directly onto the graph paper. From seismic field data the values of T and $\Delta T$ for each reflection are obtained. Using the rays and wave fronts as coordinates, the point T, $\Delta T$ on the wave-front chart is located. Since the wave-front chart is drawn to the same scale as the seismic cross-section, the point T, $\Delta T$ locates the coordinates $x$, $z$ of the reflection on the cross-section. A line is drawn at this point on the seismic cross-section in a direction tangent to the wave front, i. e., tangent to the constant T line. The slope of this line represents the dip of the reflecting horizon. Thus, by the use of the wave-front chart, the reflection point is located in two dimensions and the dip is transferred directly from the wave-front chart.

Figure 3:
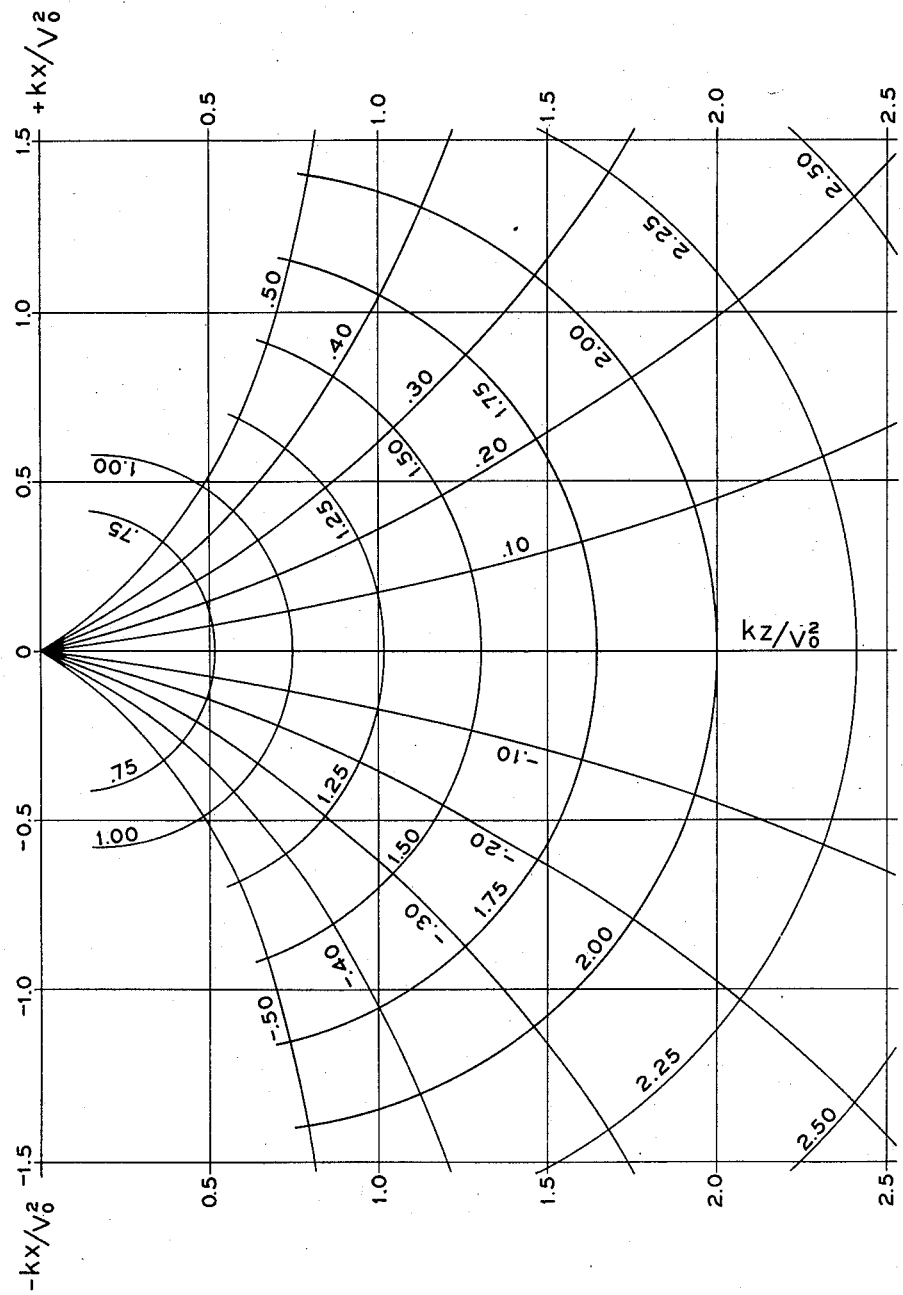
Fig. 3 illustrates a dimensionless wave-front chart.

The chart of Fig. 3, however, cannot normally be used in this manner, because the equivalent footage scale of the rectangular coordinates $x$ and $z$ depends on the numerical value of the scale factor $V_0^2/k$. For example, if this particular wave-front chart has been drawn to a scale such that one millimeter corresponds to $\frac{1}{100}$ of a unit of $kz/V_0^2$ or $kx/V_0^2$, the footage scale of this particular chart is $V_0^2/100k$ feet per millimeter. For instance, if $V_0^2/k$ is 7500 feet, one millimeter corresponds to 75 feet, or if $V_0^2/k$ is 20,000 feet, then one millimeter is equivalent to 200 feet. If the chart of Fig. 3 could be magnified by any arbitrary amount, then the magnification could be adjusted for any value of $V_0^2/k$ so that the magnified chart will have the proper scale factor of 20 feet to the millimeter. In the above example, the required magnification to achieve this scale factor is given by $V_0^2/2000 k$. Thus, if $V_0^2/k$ is 7500 feet, the desired magnification turns out to be 3.75, or if $V_0^2/k$ is 20,000 feet, Fig. 3 must be magnified by a factor of 10. In general, if $s$ is the scale factor of the chart expressed in cm./unit of $kz/V_0^2$ or $kx/V_0^2$, the required magnification is given by $V_0^2/200 ks$. The magnification essentially serves the purpose of converting the dimensionless coordinates $kz/V_0^2$ and $kx/V_0^2$ into the real coordinates $z$ and $x$, but the numbers on the rays and wave-fronts will still refer to the dimensionless quantities $V_0 \Delta T / \Delta x$ and $kT/V_0$. Once the magnification is properly adjusted, the magnified universal wave-front chart can be used like an ordinary wave-front chart except for the fact that the arrival times and stepouts must be multiplied by the constants $k/V_0$ and $V_0/\Delta x$, respectively.

Such a chart is universal in that the $T - \Delta T$ mesh need not be changed if one desires to calculate the seismic cross-section using a number of different values for $k$ and $V_0$. In applying the universal wave-front chart to a series of calculations involving different geological regions, the values of $V_0$ and $k$ are changed by changes in scale of magnification of the wave-front chart and changes in the multiplicative factors which convert real time and stepout into dimensionless time and stepout.

We assumed in the above explanation that the velocity function was described by $V = V_0 + k t_v$. The same principle of using dimensionless variables applies, however, whenever the velocity function contains only two parameters, no matter what its functional form. For instance, if $V = V_0 + az$, then the dimensionless time and stepout are $aT$ and $V_0 \Delta T / \Delta x$, respectively. In this case, the quantity which governs the magnification is $a/V_0$. The rays are circles centered at $$\frac{ax}{V_0} = \cot \theta_0$$

$$\frac{az}{V_0} = -1$$

where $$\sin \theta_0 = \frac{V_0 \Delta T}{x}$$

and passing through the origin while the wave-fronts are circles centered at $$\frac{ax}{V_0} = 0$$

$$\frac{az}{V_0} = \cosh aT - 1, \text{ with radius } r = \sinh aT$$

Thus, for given values of $$\frac{V_0 \Delta T}{\Delta x} \text{ and } aT$$

we can determine the corresponding $$\frac{az}{V_0} \text{ and } \frac{ax}{V_0}$$

For example, if $$\frac{V_0 \Delta T}{\Delta x} = .25$$

then $\sin \theta_0 = .25$, so that $\cot \theta_0 = 3.88$. If $aT = 1.6$, then sinh $aT = 2.38$; cosh $aT - 1 = 1.58$; and a dimensionless chart may be drawn to any desired scale.

By combining the universal wave-front chart with a suitable pantograph, it is possible to perform the necessary calculations and the plotting of reflection points and dips in one operation.

Figure 4:
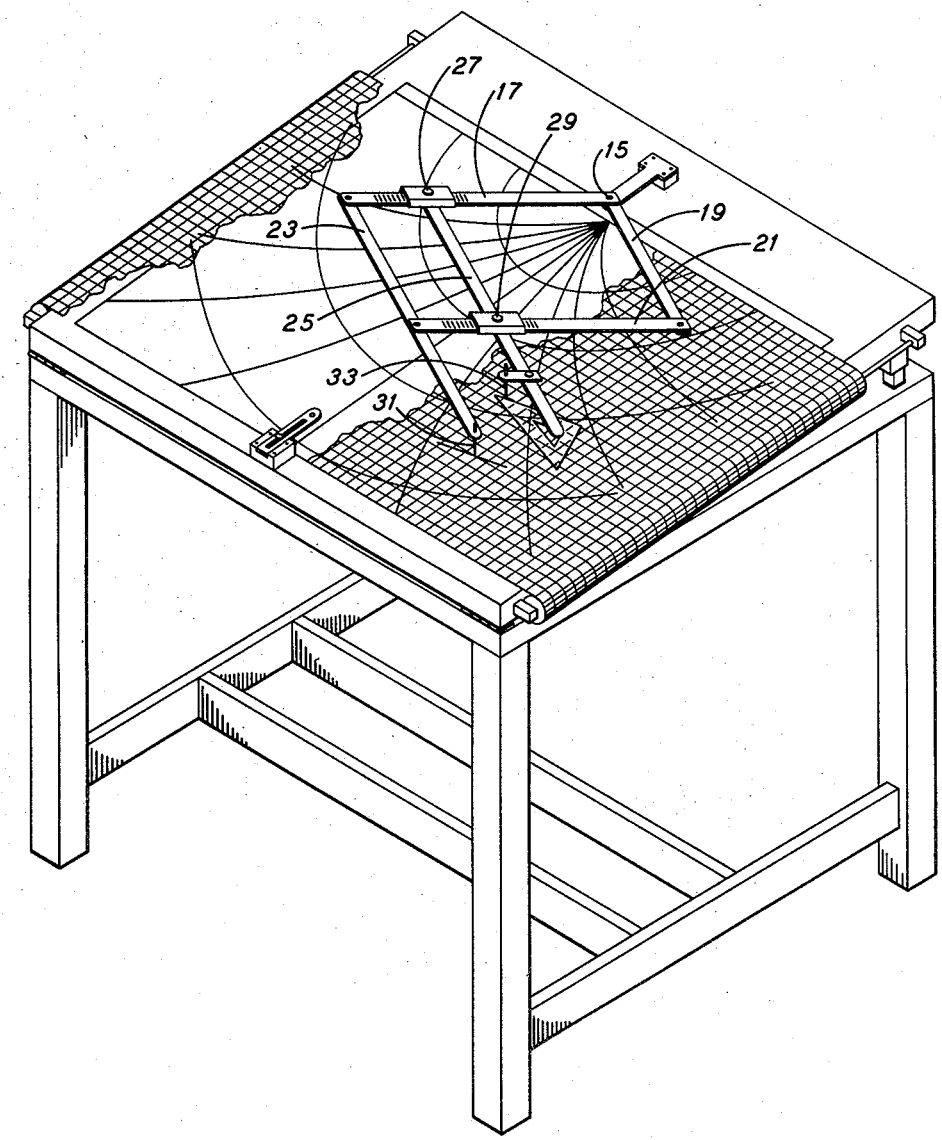
Fig. 4 illustrates a preferred embodiment of our invention.

Referring to Fig. 4, the pantograph has a fixed point 15 from which are pivotally mounted two arms 17 and 19. Two arms 21 and 23 are pivotally mounted on the ends of the arms 19 and 17. An arm 25 is slidably affixed to the arms 17 and 21 by screws 27 and 29 which permit adjustment of the arm 25 relative to the arms 17 and 21 and afford a means for securing it rigidly in the adjusted position. The arm 25 is parallel to the arm 23. A scribe 31 is at the end of the arm 23. A stylus 33 is movable along a portion of the arm 25.

In operation, the corrected shot point on the seismic profile and the origin of the wave-front chart are placed on the axis of rotation of the fixed point 15. The z direction on the wave-front chart is aligned with the z direction on the seismic profile. The seismic profile paper is placed over the wave-front chart and the wave-front chart is visible through the profile paper. The parameters in the velocity function to be used in computing the seismic cross-section are determined. Knowing these parameters and the scale of the wave-front chart, the required magnification can be computed and the pantograph adjusted.

An equivalent method of adjusting the pantograph would be, for example, to move the scribe 31 down to a position corresponding to a depth D on the seismic profile graph paper and locking it in that position vertically below the shot point. Knowing $V_0$ and $k$, we compute $$\frac{kD}{V_0^2}$$

and the corresponding value of $$\frac{kT}{V_0}$$

given by $$\frac{kT}{V_0} = \sqrt{1 + 4\frac{kD}{V_0^2}} - 1$$

By moving the arm 25 and the stylus 33, the stylus is then brought to the calculated value of $$\frac{kT}{V_0}$$

vertically under the shot point, tightened in position, and the pantograph is ready for use. This procedure automatically allows for linear shrinkage and expansion of both the graph paper and the universal wave chart. Having thus positioned the stylus and scribe, the operator computes $$\frac{V_0 \Delta T}{\Delta x}$$

and $$\frac{kT}{V_0}$$

for the particular reflection which he is computing. He moves the stylus 33 to the calculated point $$\left(\frac{V_0 \Delta T}{\Delta x}, \frac{kT}{V_0}\right)$$

He makes a short dash with the stylus 33 at this point tangent to the particular $$\frac{kT}{V_0}$$

line on the wave-front chart which he chose. The corresponding line made on the profile paper with the scribe 31 represents the dip and location within the earth of the reflection point. This procedure is repeated for each reflection which is picked from the seismic record. This procedure results in a seismic profile from which strata may be traced between control points.

It is not essential for the practice of our invention that the wave-front chart which is to be used with the pantograph be calibrated as a dimensionless wave-front chart. A conventional wave-front chart may be employed if it is re-calibrated or mathematically converted to dimensionless form. For example, Equations 1, 2 and 3 may be employed to prepare a dimensioned wave-front chart. Such a chart would have cartesian coordinates $x$ and $z$, and ray and wave-front curves calibrated in units of T and $\Delta T$. This chart would then be particular to predetermined values $k$ and $V_0$. This chart could also be used to calculate a seismic profile in a region where the predetermined velocity parameters are $k'$ and $V_0'$. If the observed arrival time and stepout are T and $\Delta T$, then the stylus must be located on the grid at the values given by:

$$T' = \frac{k' V_0}{k V_0'} T, \quad \Delta T' = \frac{V_0' \Delta x}{V_0 \Delta x'} \Delta T$$

Our invention, then, teaches the use of a computer by which a single wave-front chart may be used to plot directly on seismic profile paper the dip and location of reflection points. Heretofore, no universally applicable calculator was available, and accurate seismic profiles could not be prepared in a reasonable amount of time.

While we have described a specific embodiment of our invention, it is only for exemplary purposes and is not intended to limit the scope of our invention. Our invention, therefore, is to be limited only as set forth in the appended claims.

We claim:

1. A calculator comprising, in combination, a pantograph having a fixed datum point and a stylus adapted to move over a surface, a marker on said pantograph adapted to mark points distant from said datum point equal to the distance said stylus is spaced from said datum point times a multiplicative factor and means on said pantograph for varying said multiplicative factor, a first chart on said surface, said chart having families of dimensionless wave-front and ray curves representing the position of a seismic disturbance which originates at one edge of said chart and on a centerline thereof, said families of curves being respectively related to dimensionless depth and migration distances, means for locating the position of said seismic disturbance coincident with said datum point of said pantograph and a second chart located above said first chart, said second chart comprising a writing surface through which said first chart is visible.

2. For use in seismic surveying to determine the location of a reflection point within the earth, a wave-front chart having lines of constant $$\frac{kT}{V_0}$$

and lines of constant $$\frac{V_0 \Delta T}{x}$$

related to orthogonal coordinates $$\frac{kz}{V_0^2}$$

and $$\frac{kx}{V_0^2}$$

where T is the time for two-way reflection of the normal wave, $\Delta T$ is the step-out time, z is the depth to a reflection point, x is the migration distance of a reflection point, and $k$ and $V_0$ are defined by the seismic velocity function $$V = V_0 + k t_v$$

where $V$ = average velocity of seismic disturbance within the earth $t_v$ = one-way time, the origin of said orthogonal coordinates being at one side and on a centerline of said wave-front chart, a profile chart superimposed on said wave-front chart, and a pantograph having a stylus adapted to move over said wave-front chart and having a marker adapted to mark said profile chart in accordance with the position of said stylus on said wave-front chart for locating on said profile chart points spatially related to points on said wave-front chart by a multiplicative factor, and means for supporting said pantograph on a pivot point substantially coincident with the origin on said wave-front chart.

References Cited in the file of this patent

UNITED STATES PATENTS

| | | |
|---|---|---|
| 265,744 | Braastad | Oct. 10, 1882 |
| 2,442,098 | Shewell et al. | May 25, 1948 |
| 2,494,536 | Atwood | Jan. 17, 1950 |
| 2,656,099 | Selling | Oct. 20, 1953 |